United States Patent
Kennedy et al.

(10) Patent No.: US 6,912,795 B1
(45) Date of Patent: Jul. 5, 2005

(54) CONICAL HYDRODYNAMIC BEARING GAUGING APPARATUS AND METHOD

(75) Inventors: Michael D. Kennedy, Boulder Creek, CA (US); Michael J. Whittome, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 488 days.

(21) Appl. No.: 09/796,224

(22) Filed: Feb. 28, 2001

Related U.S. Application Data
(60) Provisional application No. 60/185,820, filed on Feb. 29, 2000.

(51) Int. Cl.$^7$ ............................. G01B 1/00; G01B 5/00; G01B 3/00; B21D 53/10
(52) U.S. Cl. ............................. 33/517; 33/833; 33/549; 29/898.09
(58) Field of Search .................... 310/15, 17, 14, 310/23; 29/898.07, 898.09; 33/832, 833, 613, 645, 549, 555, 517

(56) References Cited

U.S. PATENT DOCUMENTS

| | | | | | |
|---|---|---|---|---|---|
| 2,932,900 A | * | 4/1960 | Hanlon | ........................ | 33/517 |
| 3,191,259 A | * | 6/1965 | Dalton | ........................ | 33/517 |
| 3,785,023 A | * | 1/1974 | Harbottle | ..................... | 29/407 |
| 4,217,698 A | * | 8/1980 | Van Sickle | .................. | 33/784 |
| 4,287,758 A | * | 9/1981 | Swearingen | ............. | 73/862.49 |
| 4,349,957 A | * | 9/1982 | Lundin | ........................ | 29/596 |
| 4,928,028 A | * | 5/1990 | Leibovich | .................... | 310/23 |
| 5,055,725 A | * | 10/1991 | LaSota | ........................ | 310/14 |
| 5,070,621 A | * | 12/1991 | Butler et al. | ................. | 33/517 |
| 5,081,381 A | * | 1/1992 | Narasaki | ...................... | 310/14 |
| 5,129,156 A | * | 7/1992 | Walker | .................... | 29/898.09 |
| 5,159,754 A | * | 11/1992 | Vancsik | ................... | 29/898.09 |
| 5,325,599 A | * | 7/1994 | Russell | ........................ | 33/517 |
| 5,333,380 A | * | 8/1994 | Patz et al. | ............... | 29/898.07 |
| 5,368,425 A | | 11/1994 | Mills et al. | | |
| 5,386,630 A | * | 2/1995 | Fox | .......................... | 29/898.09 |
| 5,497,559 A | * | 3/1996 | Okumura et al. | ............. | 33/519 |
| 5,535,517 A | * | 7/1996 | Rode | ...................... | 29/898.09 |
| 6,105,439 A | * | 8/2000 | Roger | ...................... | 73/862.49 |
| 6,148,501 A | * | 11/2000 | Grantz et al. | ............ | 29/603.03 |
| 6,229,231 B1 | * | 5/2001 | Ishida et al. | .................. | 310/14 |
| 6,418,613 B1 | * | 7/2002 | Rode | ........................... | 29/714 |
| 6,651,340 B2 | * | 11/2003 | Prater | ...................... | 29/898.09 |
| 6,662,449 B2 | * | 12/2003 | Rode | ....................... | 29/898.09 |
| 2003/0150115 A1 | * | 8/2003 | Kennedy et al. | .......... | 29/898.07 |
| 2003/0182800 A1 | * | 10/2003 | Herndon et al. | ......... | 29/898.02 |

FOREIGN PATENT DOCUMENTS

JP          2001052922 A   *   2/2001   ........... H01F/7/127

* cited by examiner

*Primary Examiner*—Diego Gutierrez
*Assistant Examiner*—Mirellys Jagan
(74) *Attorney, Agent, or Firm*—Raghunath S. Minisandram; Jesus Del Castillo

(57) ABSTRACT

A conical hydrodynamic bearing gauging and seating system that enables the efficient seating of conical hydrodynamic bearings to a rotor shaft and hub while the rotor assembly remains in a pressing fixture. The invention provides a conical hydrodynamic bearing gauging and seating apparatus comprising a capacitive probe assembly disposed within a hollow pressing fixture in communication with a rotor shaft.

8 Claims, 8 Drawing Sheets

CONICAL HYDRODYNAMIC BEARING GAUGING APPARATUS AND METHOD

This application claims benefit of U.S. Provisional Application No. 60/185,820 filed Feb. 29, 2000, which is hereby incorporated by reference in its entirety.

BACKGROUND OF THE INVENTION

1. Field of the Invention

The invention relates to the field of electric motor assembly. More specifically, the present invention relates to an apparatus and method for assembling conical hydrodynamic bearings in electric motors.

2. Description of the Background Art

Disc drive memory systems have been used in computers for many years for storage of digital information. Information is recorded on concentric tracks of a magnetic disc medium, the actual information being stored in the form of magnetic transitions within the medium. The discs themselves are rotatably mounted on a spindle, while the information is accessed by read/write heads generally located on a pivoting arm which moves radially over the surface of the rotating disc. The read/write heads or transducers must be accurately aligned with the storage tracks on the disc to ensure proper reading and writing of information.

During operation, the discs are rotated at very high speeds within an enclosed housing using an electric motor generally located inside the hub or below the discs. One type of motor in common use is known as an in-hub or in-spindle motor. Such known in-spindle motors typically have a spindle mounted by two ball bearing systems to a motor shaft disposed in the center of the hub. One of the bearings is located near the top of the spindle and the other near the bottom. These bearings allow for rotational movement between the shaft and the hub while maintaining accurate alignment of the spindle to the shaft. The bearings themselves are normally lubricated by highly refined grease or oil.

The conventional bearing system described above is prone, however, to several shortcomings. First is the problem of vibration generated by the balls rolling on the bearing raceways. Ball bearings used in hard disk drive spindles run under conditions that generally guarantee physical contact between raceways and balls, this in spite of the lubrication layer provided by the bearing oil or grease. Hence, bearing balls running on the generally even and smooth, but microscopically uneven and rough raceways. The ball bearings transmit the rough surface structure as well as their imperfections in sphericity in the form of vibration to the rotating disk. This vibration results in misalignment between the data tracks and the read/write transducer. This source of vibration limits, therefore, the data track density and the overall performance of the disc drive system.

Moreover, mechanical bearings are not always scaleable to smaller dimensions. This is a significant drawback since the tendency in the disc drive industry has been to continually shrink the physical dimensions of the disc drive unit.

As an alternative to conventional ball bearing spindle systems, researchers have concentrated much of their efforts on developing a hydrodynamic bearing. In these types of systems, lubricating fluid—either gas or liquid—functions as the actual bearing surface between a stationary base of the housing and the rotating spindle or rotating hub. For example, liquid lubricants comprising oil, more complex ferromagnetic fluids, or even air have been utilized for use in hydrodynamic bearing systems. The reason for the popularity of the use of air is the importance of avoiding the outgassing of contaminants into the sealed area of the housing. However, air does not provide the lubricating qualities of oil. Its low viscosity requires smaller bearing gaps and therefore higher tolerance standards to achieve similar dynamic performance.

Therefore, there is a need in the art for an apparatus and method that enables conical bearings to be press fit to motor shafts that is expedient and precise in order to increase throughput of the motor assembly process. More specifically, there is a need to be able to press conical bearings (cones) onto a shaft, precisely measure remaining axial play, and then adjust/press cone or cones a second time to final position.

SUMMARY OF THE INVENTION

A method for measuring axial play within a cone pressing apparatus for conical hydrodynamic bearings is provided. The apparatus includes a hollow nest motor mounting fixture that is sandwiched between a rotor assembly and a capacitive gauging apparatus. The hollow nest provides a fixed area that engages the lower or bottom conical hydrodynamic bearing while allowing the motor shaft to be pressed in place. The capacitive gauging apparatus measures the distance the shaft has been pressed and measures the distance the shaft may be moved in rectilinear motion. This distance corresponds to the axial play of the conical hydrodynamic bearings and allows for axial play to be reduced without removing the motor from the hollow nest fixture.

Several embodiments of the present invention are included. These embodiments vary in the degree of complexity and automation of the capacitive gauging apparatus. The first embodiment includes a target element affixed to the rotor shaft, and a capacitive element is used to gauge the displacement of the shaft as it is moved up and down by hand. Both of the elements are coupled to a hollow nest fixture.

In another embodiment, the gauging apparatus includes an automatic actuating device that reciprocates the motor shaft and measures the distance the shaft can be moved. Again, this is used in conjunction with a capacitive element, a rotor shaft and a hollow nest fixture.

In yet another embodiment, a plurality of actuators, similar to that of the previous embodiment, are employed in order to reciprocate the motor shaft in an axial direction to determine the axial play of the shaft. Here, too, the actuators are coupled to a capacitive gauge and a hollow nest fixture that relays information to a display device.

The method provided includes in all embodiments, the mounting of a rotor, having a shaft fit between two conical hydrodynamic bearings, to a hollow nest fixture. Once mounted upon the hollow nest, the rotor shaft is moved linearly in a rectilinear fashion along its axis wherein a measurement of the axial play is taken by the capacitive gauging element. The shaft is then pressed a distance into the rotor. The shaft is again linearly reciprocated while the axial play is measured by the capacitive gauging element. If axial play is still not within the desired range, the procedure is repeated. Once the conical hydrodynamic bearings are properly positioned such that the axial play is within the desired specification, the rotor is moved to the next stage in the motor assembly process.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The following description discloses the assembly of a spindle motor incorporating a pair of conical hydrodynamic bearings and a rotary shaft which carries a hub for supporting one or more disks. This form of spindle motor is especially useful in a disk drive for a computer system. The present invention allows for measurement of the axial play of the shaft during the final cone pressing process. Adopting this approach allows the conical hydrodynamic bearings to be pressed precisely into place in less time than assembly currently takes while reducing handling and minimizing associated errors.

Figure 1:
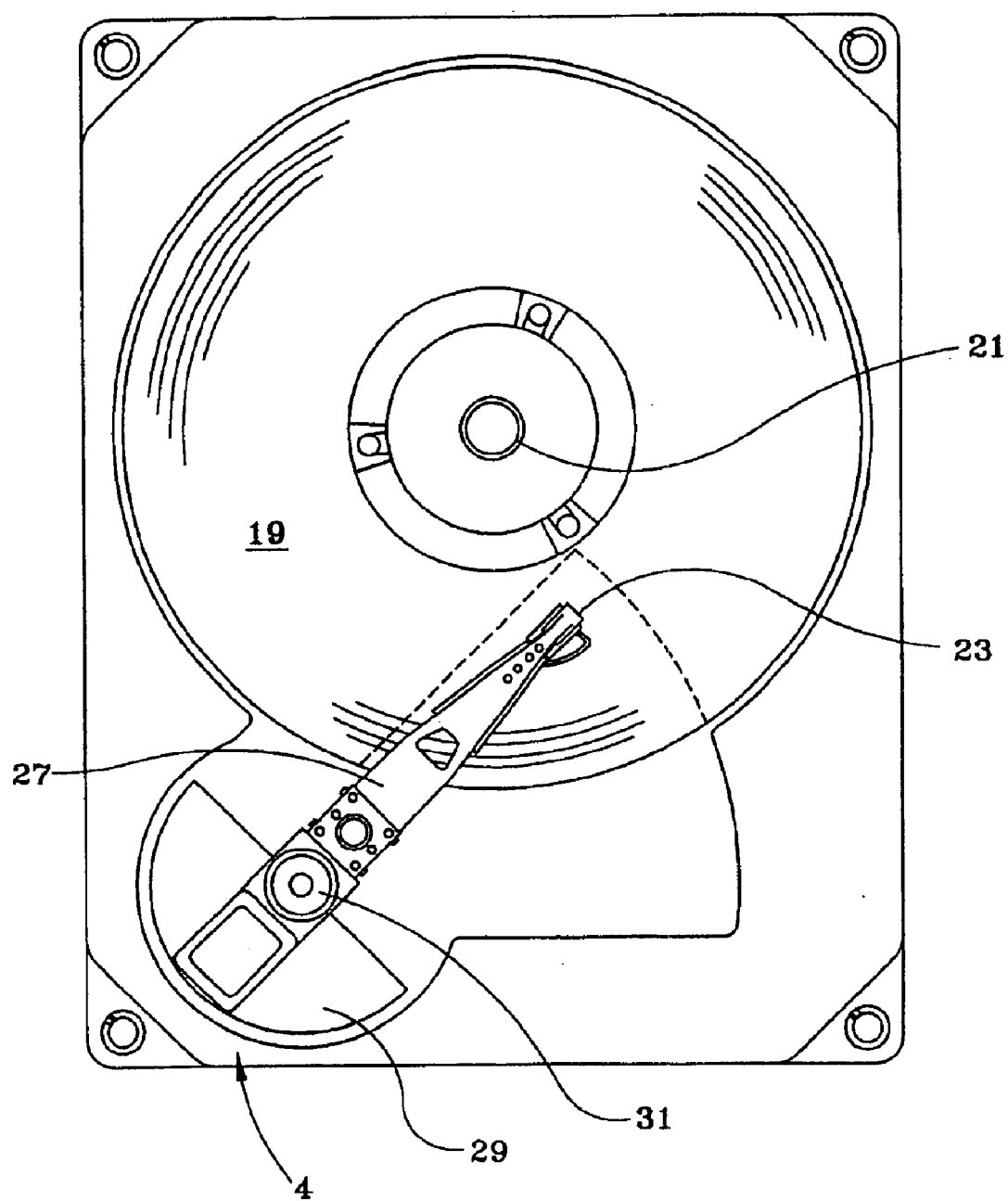
FIG. 1 is a top plan view of a known disk drive in which a motor fabricated and have the features of the present invention is useful.

A simple plan view of a disk drive of the type in which this motor is useful is shown in FIG. 1. This view illustrates the basic elements of the drive, including a rotating disk or disks 19 that are rotated by a spindle motor 21 to be described in further detail below. As the disks 19 rotate, a transducer 23 mounted on an end of an actuator arm 27 is selectively positioned by a voice coil motor 29. The VC motor 29 rotates about a pivot 31 to move the transducer 23 from track to track over the surface of the disk 19.

Figure 2:
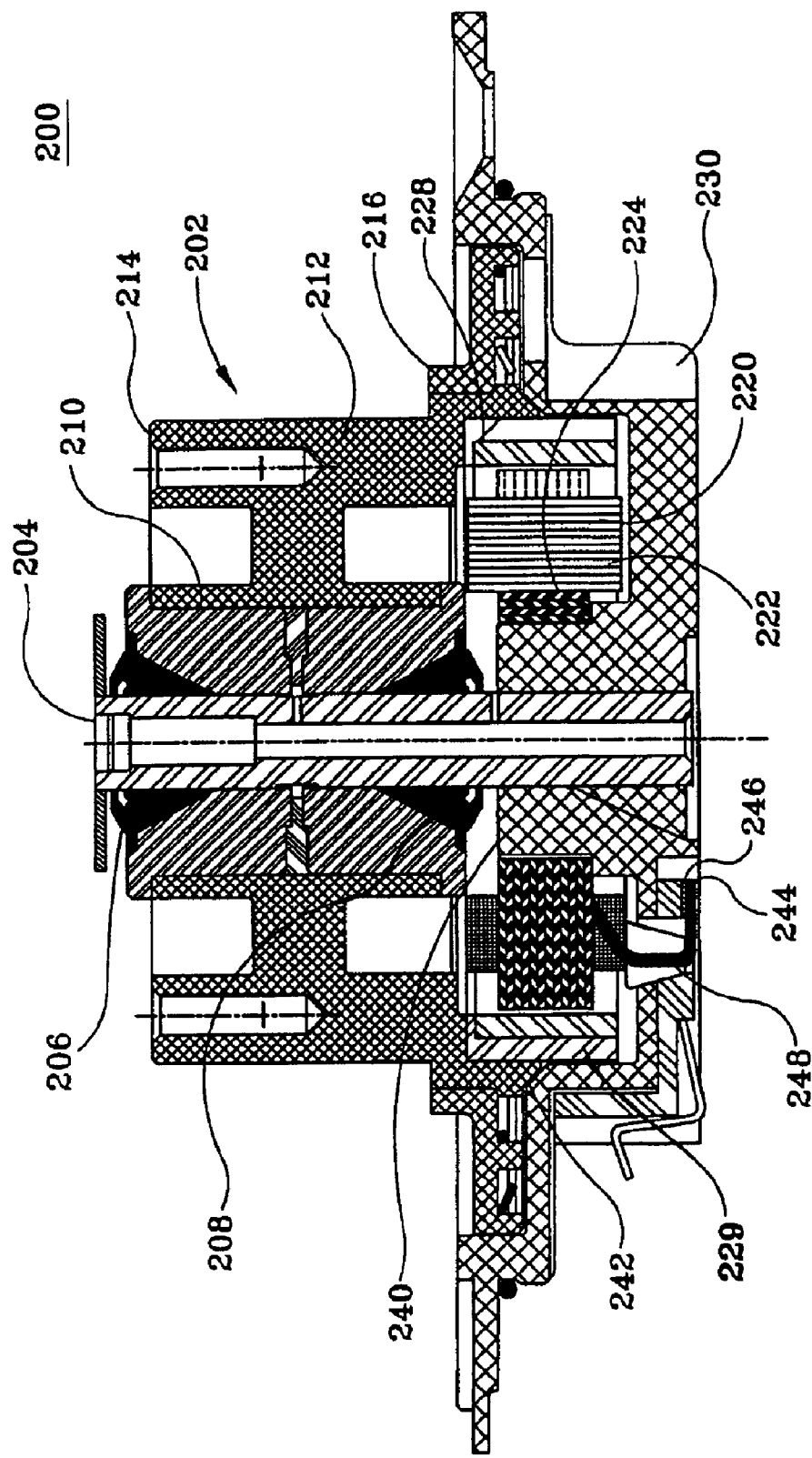
FIG. 2 is a vertical sectional view of a spindle motor having two conical hydrodynamic bearings.

FIG. 2 is a vertical sectional view of a prior art spindle motor including a set of conical hydrodynamic bearings which support the shaft 204 and the hub 202 for relative rotation. The motor is a brushless direct current motor 200 having a hub 202 rotatably mounted about stationary shaft 204 by upper and lower bearings 206 and 208, respectively. The hub 202 is formed in a generally inverted U-shape in cross-section and has an inner annular arm 210, and outer annular arm 212 and a top portion 214. Outer annular arm 212 includes a shoulder 216 for supporting a storage disk in a contaminant free environment. A plurality of storage disks separated by spacers or washers may be stacked along the length of outer annular arm 212.

The interior portion of hub 202 operably receives a stator, generally designated 220 including stator lamination stack 224 and stator windings 222. A permanent magnet 228 is mounted on a back iron 229 supported from outer annular arm 212 for magnetically interacting with magnetically active stator lamination stack 224 and stator windings 222. It is to be understood that a plurality of permanent magnet segments may be substituted for permanent magnet 228.

The disk drive motor 200 is mounted to a frame or base member 230 of disc drive assembly 200 by inserting member 230.

A stator support 240 surrounds stationary shaft 204 and supports stator 220 in a substantially vertical position. Stator support 240 comprises a boss 242 formed in base plate member 230 which serves to maintain disc drive motor 200 in a spaced relation with respect to base member 230. The stator 220 is bonded to the base 230.

A printed circuit connector 244 is mounted to a lower surface 246 of the base member 230. Printed circuit connector 244 is electronically connected to stator windings 222 by a wire 248 for electrical communication between the stator windings and a printed circuit board (not shown). Circuitry is etched on a lower surface of circuit connector 244 for transmitting electrical signals from drive electronics or speed control circuits carried on external printed circuit boards or the like.

The present invention provides an apparatus and method that allows an electric spindle motor with conical hydrodynamic bearings to be quickly and easily assembled.

Figure 3A:
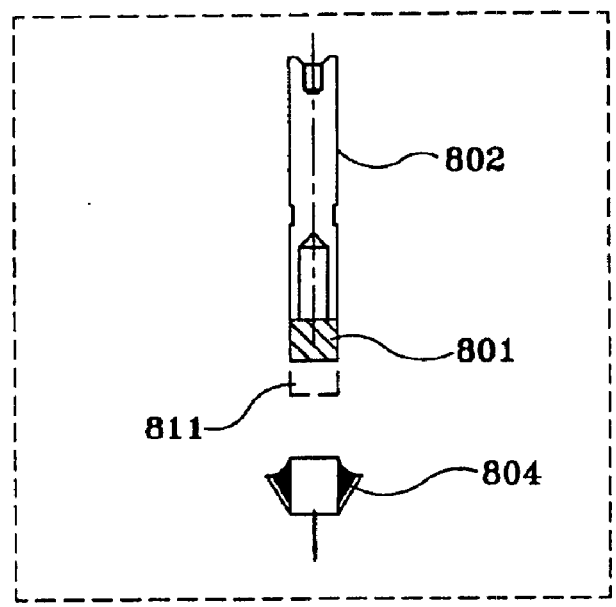
FIGS. 3A–3F are schematics of a conical bearing assembly and gauging apparatus.
Figure 3B:
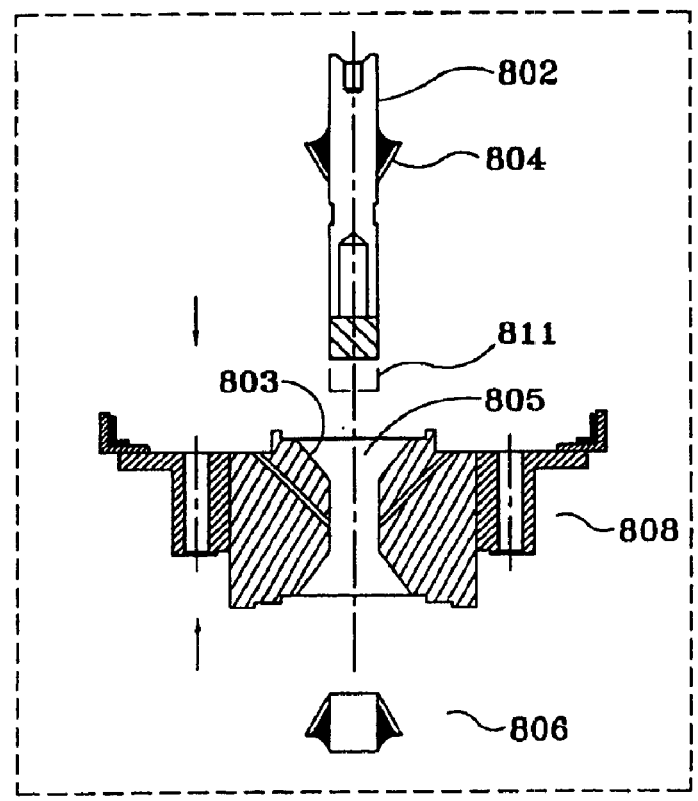
Figure 3C:
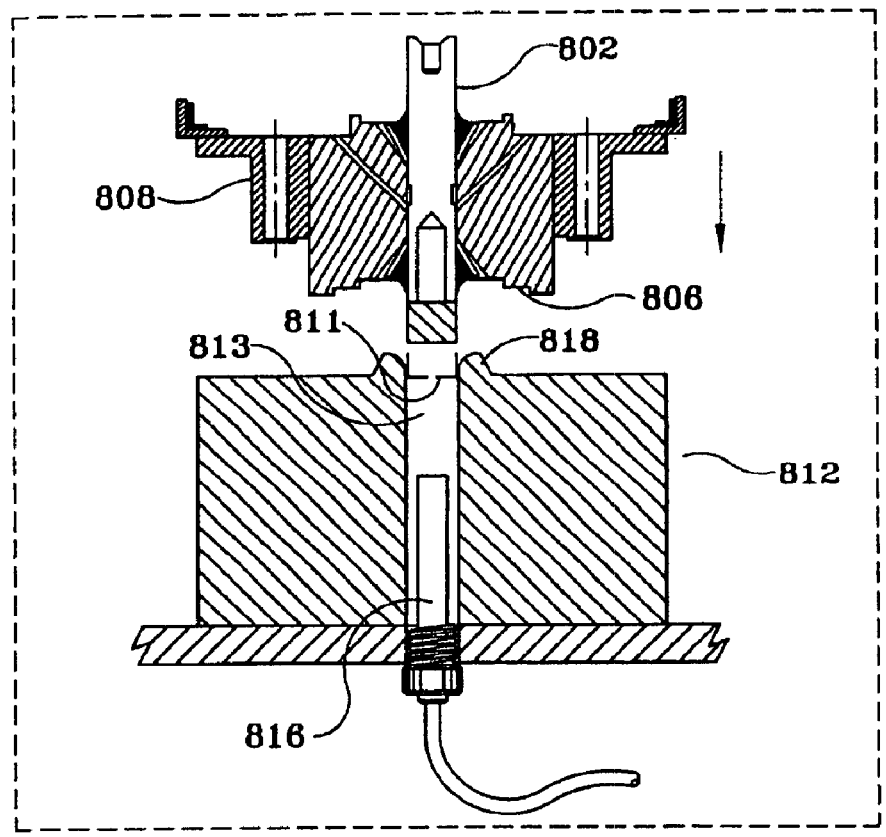
Figure 3D:
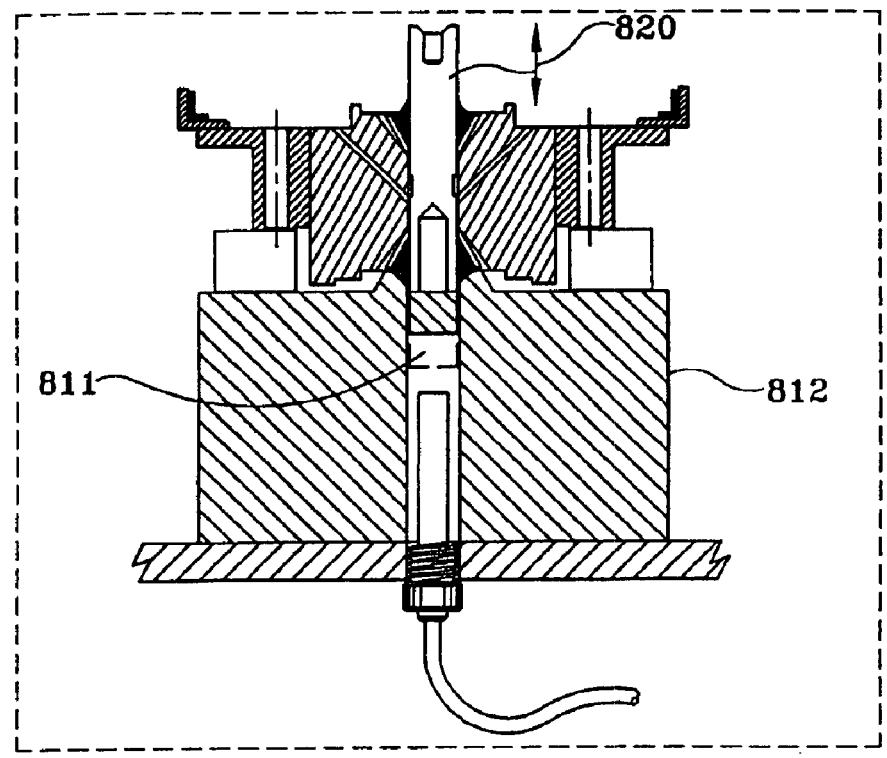
Figure 3E:
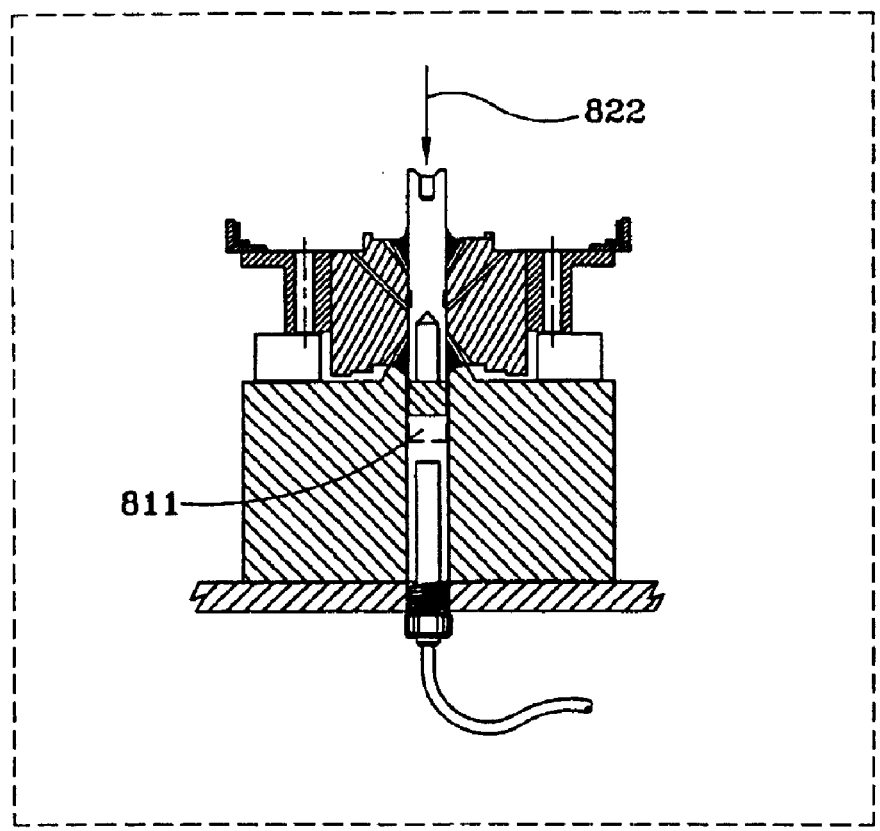
Figure 3F:
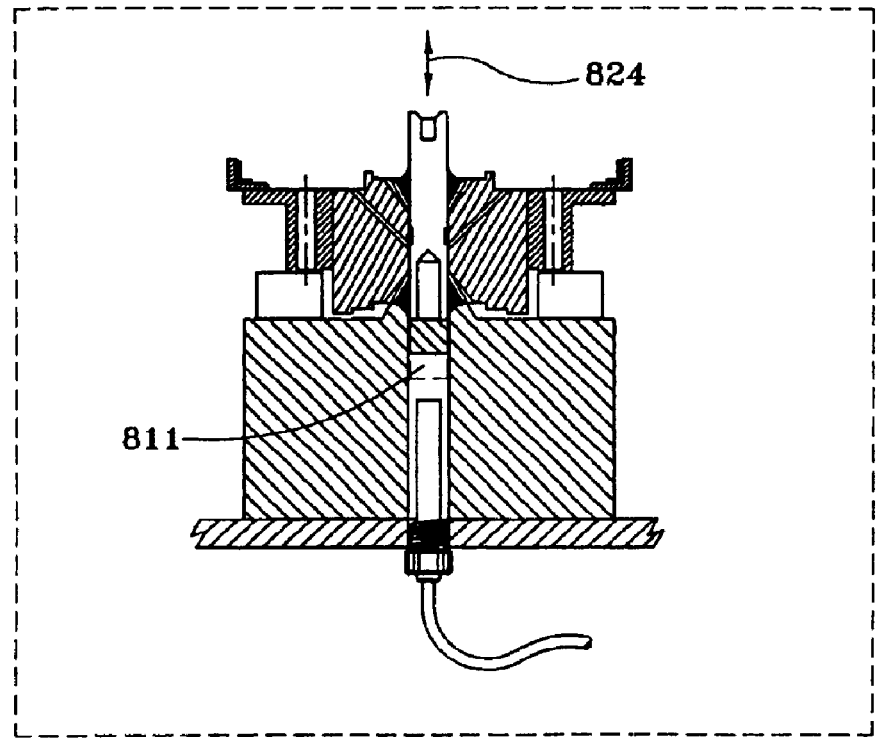
Figure 4:
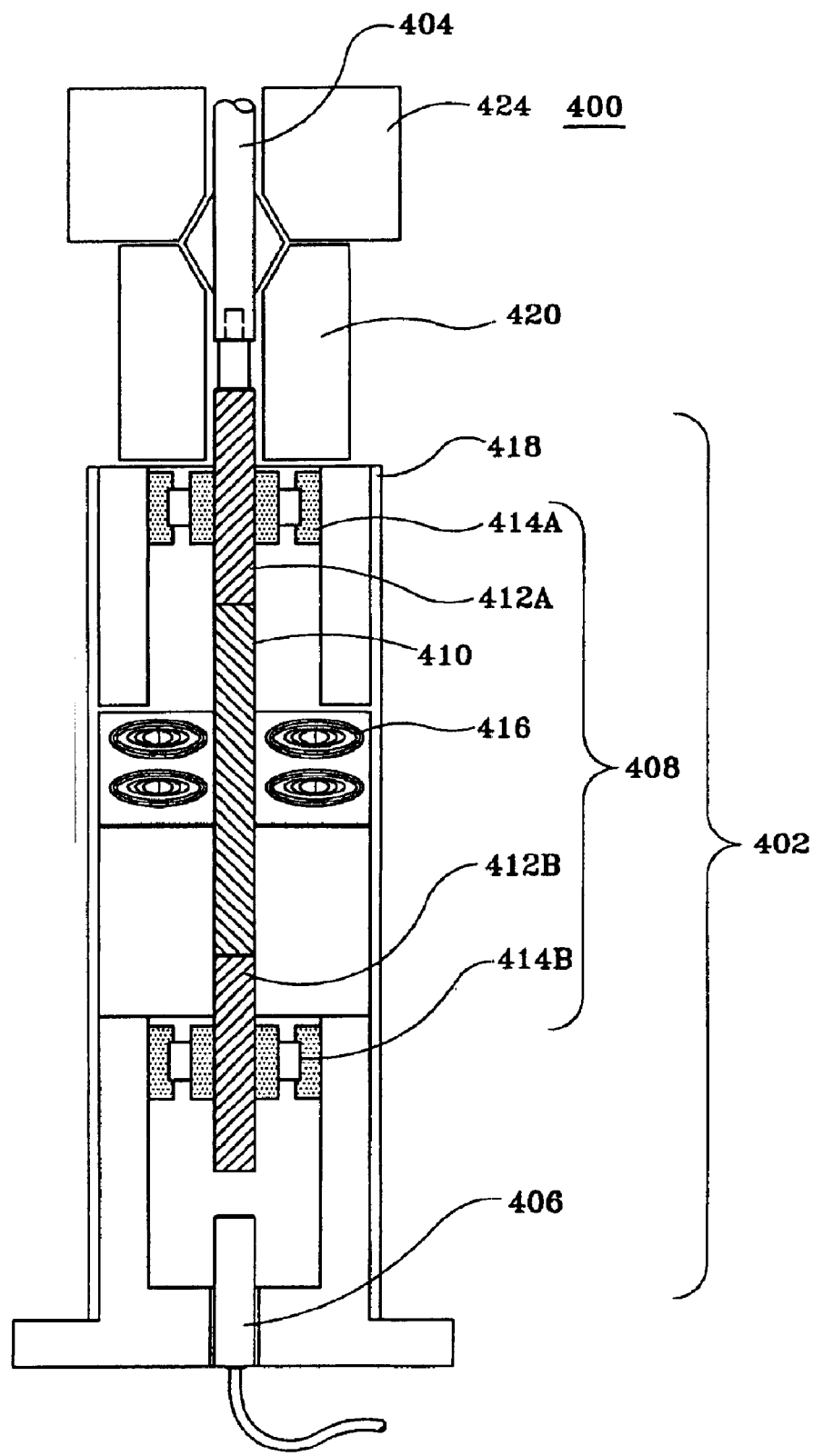
FIG. 4 is a partial vertical sectional view of another embodiment of the present invention.

FIG. 4 is a vertical sectional view of an embodiment 400 of the present invention and specifically the apparatus for carrying out the measurement of axial play in the shaft illustrated in FIG. 3D. The linear actuator and capacitive gauging apparatus 402 includes a shaft actuator 408 device for moving the rotor shaft 404. The shaft actuator 408 moves the rotor shaft 404 in a reciprocating axial motion. The shaft actuator 408 includes a magnetic shaft 410, two other shafts 412A and 412B, linear bearings 414A and 414B and two oppositely wound coils 416. The shafts 412A and 412B are held in place by a pair of linear bearings 414A and 414B. The linear bearings 414A and 414B position the magnetic shaft 410 such that it is disposed through the center of coils 416. The linear actuator and gauging apparatus 402 is disposed within a housing 418 and coupled on one end to a nest fixture 420. The assembly 400 may be permanently affixed or removably affixed by any method, including but not limited to, welding, bolting, gluing or threading Because the shaft assembly is directly coupled to the rotor shaft 404, any movement of the magnetic shaft 410 will translate into axial play of the rotor shaft 404. Thus, the axial play can be measured by monitoring the motion of the lower shaft in shaft actuator 412B using the capacitive probe 406 as described above with reference to FIGS. 3D–3F.

Furthermore, the upward force and the downward force can be set to different levels so as to offset the weight of rotor shaft 404 and the conical shaft assembly 424. The technique of inputting a sign wave into the magnetic coil assembly 416 causes the magnetic shaft 410 to reciprocate; thus, a large number of axial play measurements can be taken on a rotor assembly 424 in a short amount of time using this technique. This method produces statistically more reliable measurements of the axial play in a particular rotor assembly than could be obtained previously.

Figure 5:
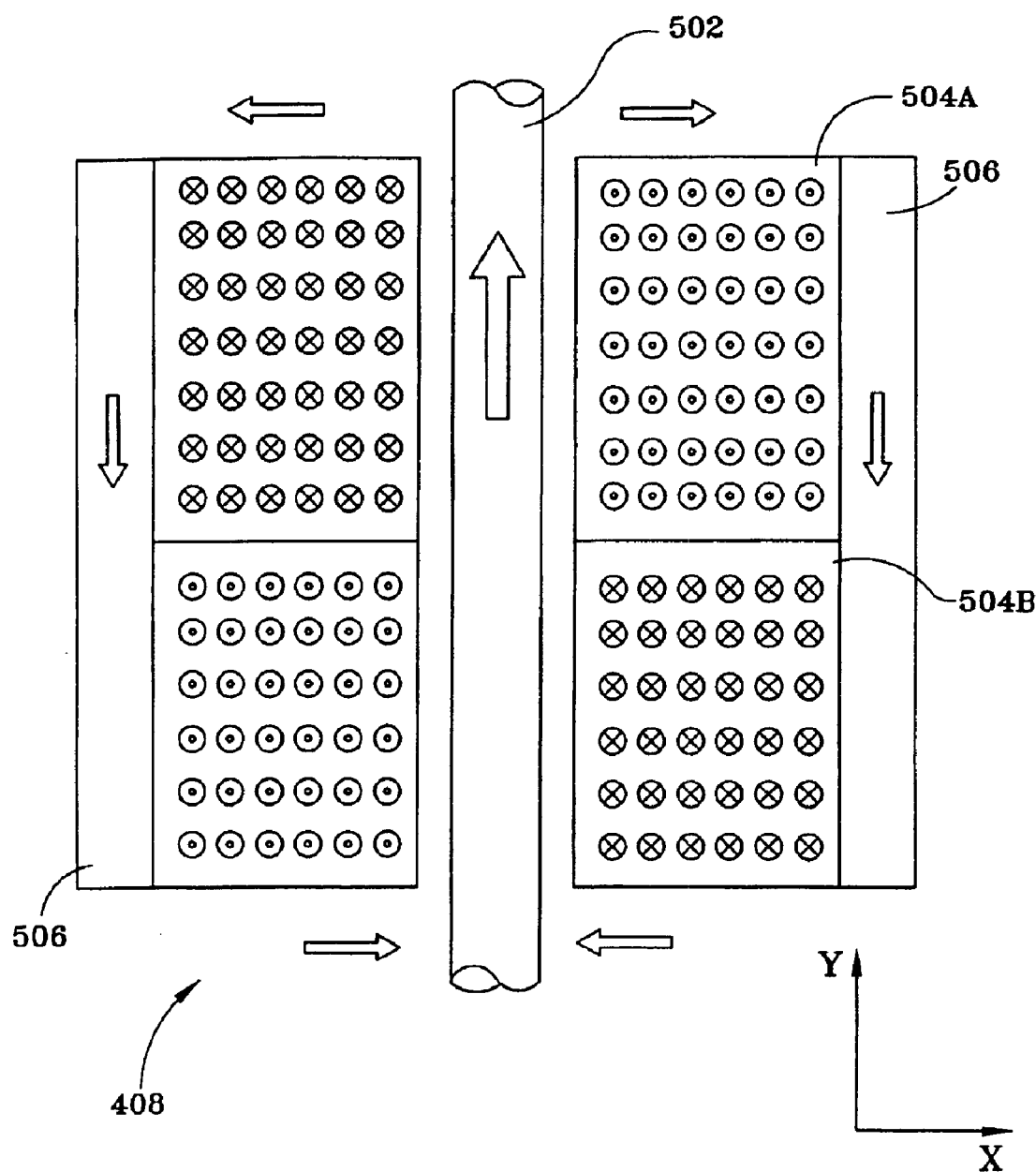
FIG. 5 is a vertical sectional view of the magnetic shaft and coil as shown in FIG. 4.

FIG. 5 is an enlarged view of a vertical sectional view of the magnetic coil assembly of the shaft actuator 408 of FIG. 4. In this figure, a magnetic shaft 502 is disposed between two rows of wound linear voice coils 504A and 504B. Surrounding the outside of the linear voice coils is the back iron section 506. The two coils 504A and 504B are wound in opposite directions and placed on the inside of the back iron 506. When a voltage is applied to the coils, the current in the upper coil 504A is moving clockwise when viewed from above. If the magnetic field at the top of the magnetic shaft 502 is moving out radially, through the coil 504A and back iron 506, the force produced will be orthogonal to the magnetic field and current vectors. These forces translate into up or down movements of the magnetic shaft 502 in the Y direction. The resulting magnetic field in the return path at the bottom will be in the opposite direction of the top. To produce a force in the same direction, the lower coil 504B must be wound in the opposite direction.

Figure 6:
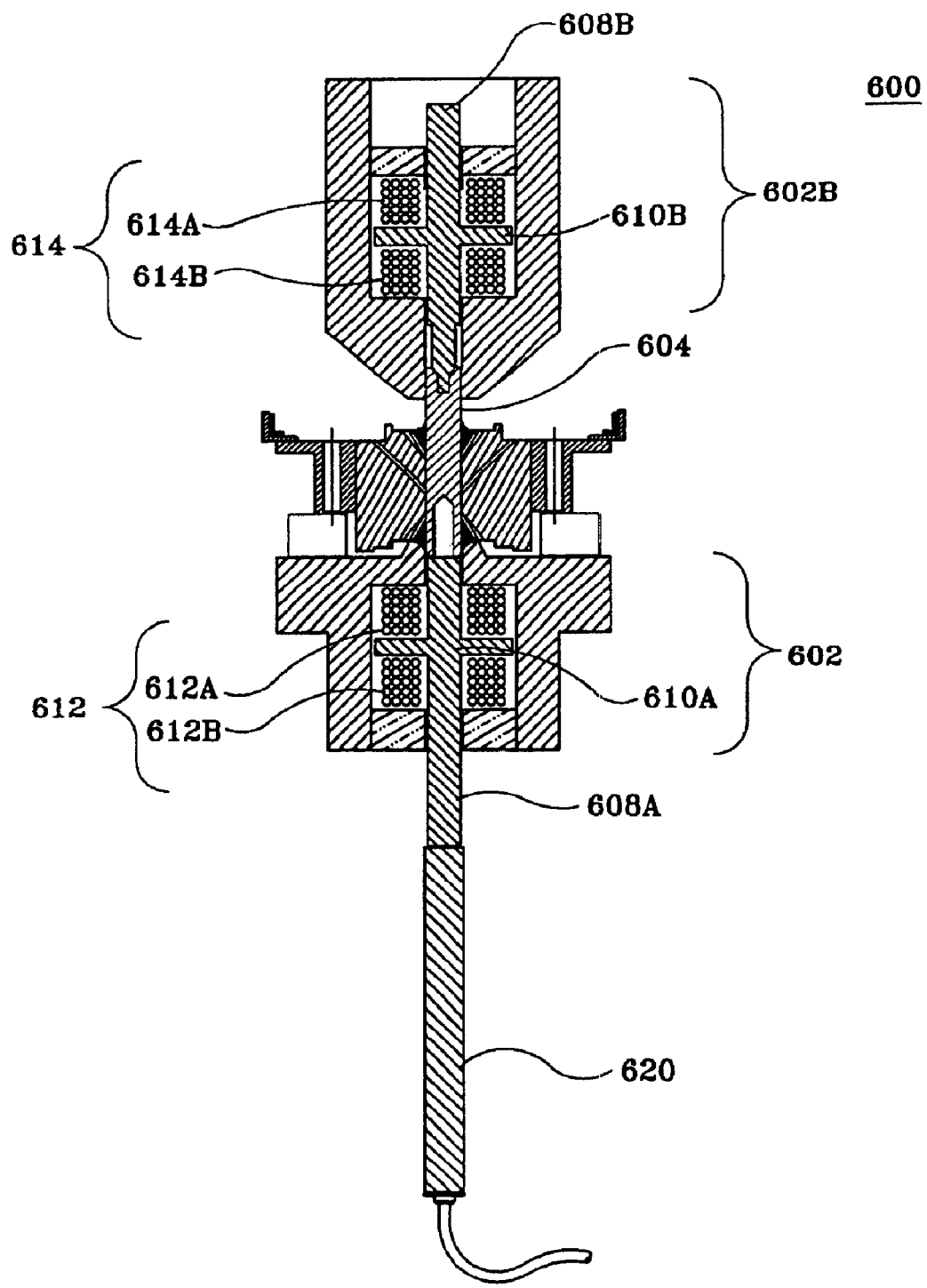
FIG. 6 is a vertical sectional view of yet another embodiment of the present invention.

FIG. 6 is a vertical sectional view of another embodiment 600 of the present invention. This apparatus measures axial play of a spindle motor by using a system similar to that of the previous embodiment. In this embodiment, however, dual shaft actuators 602 and 602B are employed to apply force to the rotor's shaft 604 to obtain a measurement of axial play of the shaft 604.

This design incorporates flanged magnetic shafts 608A and 608B. Each of the shafts has a magnetic flange 610A and 610B located near the center and extending radially outward. The magnetic shafts 608A and 608B for both the upper and the lower linear voice coil actuators 602 and 602B are substantially similar. The actuators 602 and 602B each engage the rotor shaft 604 axially along a geometric center line. Each of the magnetic voice coil actuators 602 and 602B has a pair of magnetic-wound coils 612 and 614 above and below the flanges 610A, 610B of the magnetic shafts 608A and 608B. The magnetic coils 612 and 614 consist of an upper set 612A and 614A and a lower set 612B and 614B for each of the actuators 602 and 602B. The magnetic coils 612 and 614 in each of the actuators 602 and 602B consist of the lower coil 612A and 614B wound in a first direction and the upper coil 612A and 614A wound in a second direction. When a current is applied to the actuators 602 and 602B, the magnetic shafts 608A and 608B are forced to move. As in the previous embodiment, a capacitive probe 620 is located under the shaft actuator 608A for measuring the axial movement of the rotor shaft 604.

FIGS. 3A through 3F illustrate a method for assembling the rotor assembly, such as used in the motor of FIG. 2. FIG. 3A depicts a rotor shaft 802 for a spindle motor as used in accordance with a first embodiment of the present invention. In FIG. 3A, the lower male cone 804 is pressed onto the rotor shaft 802. (Note that the shaft and hub assembly depicted in this and the following figures is upside down from the way it will be incorporated into a furnished motor.) The lower male cone 804 is pressed a distance onto the rotor shaft 802 such that it allows the rotor shaft 802 to pass through the rotor assembly 808. Enough space is allowed on the rotor shaft 802 so that the upper cone 806 may be pressed onto the rotor shaft 802 to cooperate with the opposite portion of the rotor 808 as shown in FIG. 3B.

FIG. 3B shows a further step in the construction of the rotor assembly 800. The rotor shaft 802 is inserted into the central aperture 805 of the rotor 808. The rotor shaft 802 is pushed through the rotor 808 until the lower male cone 804 comes in contact with the lower female cone 803 of the rotor 808. An upper male cone 806 is pressed onto the rotor shaft 802 from the lower side as shown, thus capturing the rotor shaft 802 within the rotor 808.

FIG. 3C shows a further step in the construction of the rotor assembly 800 wherein the rotor 808 is supported on the nest fixture 812. For proper support to occur, the rotor 808 must be aligned with the nest 812 so that the rotor shaft 802 may enter the nest aperture 813. The alignment is critical because the rotor shaft 802 must enter the nest aperture 813 in order for the shoulders 818 to support the male cone 806.

Once properly mounted as shown in FIG. 3D, the rotor shaft 802 is in communication with the capacitive probe 816 by means of target 811 fixed to shaft 802. At this stage of assembly, the rotor shaft 802 is caused to move in a reciprocating fashion along its geometric axis as illustrated by double arrow 820 by apparatus to be described with respect to FIGS. 4 et seq. The movement is sensed by the capacitive probe 816 which relays data regarding the amount of movement sensed to a display device (not shown). The capacitive probe 816 is able to sense the distance of the target element 811 to the capacitive probe 816 through the use of an electrical impulse. The capacitive probe 816 sends and receives signals when energized such that the capacitance can be measured between the probe 816 and the surface of the target elements 811, so that even very small capacitances can be measured accurately. The capacitance measured is then converted to a distance measurement.

After the data has been interpreted and a solution calculated, a force, as illustrated by arrow 822, is applied to the top of the shaft, as seen in FIG. 3E, in order to move the male portion of the conical hydrodynamic bearings 806 closer to the female portion.

The rotor shaft 802 is again moved in a reciprocating fashion, illustrated by double arrow 824, as shown in FIG. 3F. Movement of the rotor shaft 802 will be detected by the capacitive probe 816 and converted into a measurement representing the total axial play available to shaft 802, this measurement thus accurately represents the total gap in the two hydrodynamic bearings 804, 806. Another pressing and measurement can then take place until a target measurement is achieved. The rotor assembly 808 is then ready to go onto other stages of preparation as commonly known in the art in order to produce an electric motor.

Although various embodiments which incorporate the teachings of the present invention have been shown and described in detail herein, those skilled in the art can readily devise many other varied embodiments that still incorporate these teachings.

What is claimed is:

1. A gauging apparatus for accurately determining positioning of conical bearings on a motor shaft comprising:

a nest having an aperture for accepting an end of the motor shaft and supporting at least a section of one conical bearing;

a target element movable with the accepted end of the motor shaft and cooperating with a shaft actuator for axially moving the motor shaft, said shaft actuator cooperating with a shaft position probe to provide a measure of axial play of the shaft which is usable to position a section of the conical bearings on the shaft, and the shaft actuator comprising a magnetic shaft coupled to the accepted end of the motor shaft, a first pair of electrical coils adjacent the magnetic shaft, and an input for electrical current to the coils to cause reciprocation of the motor shaft to provide the measure of axial play.

2. The apparatus of claim 1, wherein the apparatus further comprises:

an upper magnetic shaft disposed in linear alignment along a longitudinal geometrical axis of the motor shaft and cooperating with the other end of the motor shaft, and a second pair of electrical coils adjacent the upper magnetic shaft.

3. The apparatus of claim 1, wherein the probe is a capacitive probe.

4. The apparatus of claim 1, wherein the shaft actuator further comprises a plurality of bearings that are in contact with the magnetic shaft to support reciprocating motion of the shafts.

5. The apparatus of claim 1, wherein the nest further comprises a hollow cavity and a shoulder feature for supporting the section of the conical bearing.

6. The apparatus of claim 5, wherein the shoulder feature further comprises a raised region disposed about the hollow cavity whereby the shoulder functions to support the section of the conical bearing during the determining operation, the section comprising a male cone portion of the bearing.

7. Apparatus for gauging axial play of a motor shaft relative to a surrounding hub, the shaft supporting portions of conical hydrodynamic bearings thereon, comprising:

means for supporting a section of one of said hydrodynamic bearings;

means for axially moving the shaft relative to the supporting means, wherein the means for axially moving the shaft comprises a magnetic shaft coupled to the motor shaft, a first pair of electrical coils adjacent the magnetic shaft, and an input for electrical current to the coils to cause reciprocation of the motor shaft to provide the measure of axial play; and means for measuring the axial play of the motor shaft relative to the hub as established by the moving means wherein the magnetic shaft is a lower magnetic shaft and the means for axially moving the motor shaft further comprises an upper magnetic shaft disposed in linear alignment along a longitudinal geometrical axis of the motor shaft and cooperating with the other end of the motor shaft, a second pair of electrical coils adjacent the upper magnetic shaft, and a plurality of bearings that are in contact with the upper and lower shafts.

8. A gauging apparatus for accurately determining positioning of conical bearings on a motor shaft, the apparatus comprising:

a shaft actuator comprising a magnetic shaft coupled to an end of the motor shaft, a first pair of electrical coils adjacent the magnetic shaft, and an input for electrical current to the coils to cause reciprocation of the motor shaft;

a shaft position probe to provide a measure of an axial play of the shaft which is usable to position a section of the conical bearings on the motor shaft;

a second pair of electrical coils adjacent to an upper magnetic shaft cooperating with the other end of the motor shaft and in linear alignment with an axis of the motor shaft; and a plurality of bearings in contact with the magnetic shafts.

* * * * *